US011283143B2

(12) United States Patent
Aston et al.

(10) Patent No.: US 11,283,143 B2
(45) Date of Patent: Mar. 22, 2022

(54) ADDITIVELY MANUFACTURED RADIO FREQUENCY FILTER

(71) Applicant: The Boeing Company, Chicago, IL (US)

(72) Inventors: Richard W. Aston, Brea, CA (US); Nicole M. Hastings, Hermosa Beach, CA (US); Nicole Diane Schoenborn, El Segundo, CA (US)

(73) Assignee: The Boeing Company, Chicago, IL (US)

( * ) Notice: Subject to any disclaimer, the term of this patent is extended or adjusted under 35 U.S.C. 154(b) by 50 days.

(21) Appl. No.: 16/422,939

(22) Filed: May 24, 2019

(65) Prior Publication Data

US 2020/0373642 A1    Nov. 26, 2020

(51) Int. Cl.
| | | |
|---|---|---|
| *H01P 1/207* | (2006.01) | |
| *H01P 3/02* | (2006.01) | |
| *H01P 1/211* | (2006.01) | |
| *B22F 5/10* | (2006.01) | |
| *H01P 11/00* | (2006.01) | |
| *B22F 10/20* | (2021.01) | |
| *B33Y 10/00* | (2015.01) | |
| *B33Y 70/00* | (2020.01) | |
| *B33Y 80/00* | (2015.01) | |

(52) U.S. Cl.
CPC ............... *H01P 1/207* (2013.01); *B22F 5/10* (2013.01); *B22F 10/20* (2021.01); *H01P 1/211* (2013.01); *H01P 3/02* (2013.01); *H01P 11/007* (2013.01); *B33Y 10/00* (2014.12); *B33Y 70/00* (2014.12); *B33Y 80/00* (2014.12)

(58) Field of Classification Search
CPC ............. H01P 1/207; H01P 3/02; H01P 1/211
USPC .................................................. 333/209–212
See application file for complete search history.

(56) References Cited

U.S. PATENT DOCUMENTS

| | | | |
|---|---|---|---|
| 2,478,913 A | 8/1949 | Goldberg | |
| 3,597,710 A * | 8/1971 | Levy | ...................... H01P 1/211 333/210 |
| 4,668,956 A | 5/1987 | Mahnad | |
| RE32,485 E | 8/1987 | Yang et al. | |
| 5,182,849 A * | 2/1993 | Marco | .................. H01P 11/002 164/132 |
| 6,323,819 B1 | 11/2001 | Ergene | |
| 9,496,621 B2 | 11/2016 | Meschini et al. | |

(Continued)

FOREIGN PATENT DOCUMENTS

| | | |
|---|---|---|
| CN | 102361116 A | 2/2012 |
| KR | 20190044527 A | 4/2019 |
| WO | 2012076994 A1 | 6/2012 |

OTHER PUBLICATIONS

Saucourt, Jeremy et al., "Design of 3D printed plastic modular filters", 2016 46th European Microwave Conference (EUMC), European Microwave Association, Oct. 4, 2016, pp. 369-372.

(Continued)

*Primary Examiner* — Rakesh B Patel
(74) *Attorney, Agent, or Firm* — Kolisch Hartwell, P.C.

(57) ABSTRACT

A radio frequency filter apparatus is disclosed, including an elongate hollow body portion having an inner side and an outer side. The apparatus further includes an iris structure on the inner side of the body portion and a stiffening structure on the outer side of the body portion. The stiffening structure is aligned with the iris structure.

20 Claims, 6 Drawing Sheets

(56) References Cited

U.S. PATENT DOCUMENTS

| | | | |
|---|---|---|---|
| 9,608,333 | B1 | 3/2017 | Toledo et al. |
| 9,742,069 | B1 | 8/2017 | Hollenbeck et al. |
| 10,355,359 | B1 | 7/2019 | Butscher et al. |
| 10,589,878 | B2 | 3/2020 | Veto et al. |
| 10,751,988 | B1 * | 8/2020 | Snyder ............. B29D 11/00663 |
| 2010/0065192 | A1 | 3/2010 | Wilson et al. |
| 2011/0279339 | A1 | 11/2011 | Johnston |
| 2012/0044119 | A1 | 2/2012 | Libonati et al. |
| 2016/0067740 | A1 | 3/2016 | Voris et al. |
| 2016/0107380 | A1 | 4/2016 | Smoot et al. |
| 2016/0167312 | A1 | 6/2016 | Feinberg et al. |
| 2017/0036783 | A1 | 2/2017 | Snyder |
| 2017/0062925 | A1 | 3/2017 | Sanchez |
| 2017/0159447 | A1 | 6/2017 | Clum et al. |
| 2017/0252804 | A1 | 9/2017 | Hanni et al. |
| 2017/0361534 | A1 | 12/2017 | Fernandez-Nieves et al. |
| 2018/0021140 | A1 | 1/2018 | Angelini et al. |
| 2018/0083350 | A1 | 3/2018 | Lam et al. |
| 2018/0087443 | A1 | 3/2018 | Adriany et al. |
| 2018/0184550 | A1 | 6/2018 | Jenkins et al. |
| 2018/0229863 | A1 | 8/2018 | Veto et al. |
| 2018/0258382 | A1 | 9/2018 | Keselowsky et al. |
| 2018/0311733 | A1 | 11/2018 | Zafar et al. |
| 2019/0291186 | A1 | 9/2019 | Aston et al. |
| 2020/0112107 | A1 | 4/2020 | Taptic et al. |
| 2020/0373657 | A1 | 11/2020 | Aston et al. |

OTHER PUBLICATIONS

Peverini, Oscar A. et al., "Selective Laser Melting Manufacturing of Microwave Waveguide Devices", Proceedings of the IEEE, IEEE, New York, US, vol. 105, No. 4, Apr. 1, 2017, pp. 620-631.

Talom, F. Tchoffo et al., "Additive manufacturing form RF microwave devices: Design, performances and treatments improvement evaluations", 2017 International Conference on Electromagnetics in Advanced Applications (ICEAA), IEEE, Sep. 11, 2017, pp. 1473-1476.

Booth, Paul A. et al., "Realizing advanced waveguide bandpass filters using additive manufacturing", IET Microwaves, Antennas & Propagation, The Institution of Engineering and Technology, United Kingdom, vol. 11, No. 14, Nov. 19, 2017, pp. 1943-1948.

Peverini, Oscar A. et al., "Additive manufacturing of Ku/K-band waveguide filters: a comparative analysis among selective-lithography" IET Microwaves, Antennas & Propagation, vol. 11, No. 14, Nov. 19, 2017, pp. 1936-1942.

Salak, Milan et al., "W-Band Waveguide Bandpass Filters Fabricated by Micro Laser Sintering", IEEE Transactions on Circuits and Systems II: Express Briefs, IEEE, US, vol. 66, No. 1, Jan. 1, 2019, pp. 61-65.

European Patent Office, Extended European Search Report regarding European Patent Application No. 20164010.9, dated Sep. 18, 2020, 12 pages.

European Patent Office, Extended European Search Report regarding European Patent Application No. 20170572.0 dated Oct. 28, 2020, 7 pages.

U.S. Patent and Trademark Office, Final Office Action regarding U.S. Appl. No. 15/933,289, dated May 15, 2020, 9 pages.

U.S. Patent and Trademark Office, Non-Final Office Action regarding U.S. Appl. No. 15/933,289, dated Sep. 14, 2020, 11 pages.

Huang, Guan-Long et al., "3-D Metal-Direct-Printed Wideband and High-Efficiency Waveguide-Fed Antenna Array", The Institute of Electrical and Electronics Engineers, Inc. (IEEE) Conference Proceedings, May 1, 2015, p. 1.

Kaddour, Abdul Sattar et al., "3D Printed Compact Dual-Polarized Wideband Antenna", 2017 11th European Conference on Antennas and Propagation (EUCAP), EURAAP Mar. 19, 2017, pp. 3441-3443.

European Patent Office, Extended European Search Report regarding European Patent Application No. 19164587.8, dated Aug. 6, 2019, 10 pages.

U.S. Patent and Trademark Office, Non-Final Office Action regarding U.S. Appl. No. 15/933,289, dated Dec. 5, 2019, 12 pages.

U.S. Patent and Trademark Office, Non-Final Office Action regarding U.S. Appl. No. 16/422,949, dated Apr. 9, 2021, 31 pages.

Wang et al., "A Wideband Millimeter-Wave Circularly Polarized Antenna With 3-D Printed Polarizer", IEEE Transactions on Antennas and Propagation, vol. 65, No. 3, Mar. 1, 20217, pp. 1038-1046.

Hindle, Pat, "Antenna Technologies for the Future", Microwave Journal, Jan. 15, 2018, Retrieved from the Internet: URL: https://www.microwavejournal.com/articles/print/29572-antenna-technologies-for-the-future, retrieved on Jul. 27, 2020, 9 pages.

European Patent Office, Examination Report regarding European Patent Application No. 19164587.8, dated Aug. 5, 2020, 8 pages.

European Patent Office, Examination Report regarding European Patent Application No. 19164587.8, dated Mar. 5, 2021, 7 pages.

U.S. Patent and Trademark Office, Final Office Action regarding U.S. Appl. No. 16/422,949, dated Sep. 16, 2021, 27 pages.

* cited by examiner

ADDITIVELY MANUFACTURED RADIO FREQUENCY FILTER

FIELD

This disclosure relates to systems and methods for filtering electronic signals. More specifically, the disclosed examples relate to radio frequency waveguide filters.

INTRODUCTION

Electronic filters are an important element of electronic engineering. In radio communications technology, filters are used for signal selection and/or noise reduction in radio signals. Typically, radio frequency (RF) filters are made up of one or more coupled resonators. Waveguide filters, which are particularly useful for the microwave frequency band, often consist of a hollow metal tube with internal structures that form a series of coupled resonators. Common coupling structure types include apertures, irises, and posts. The interior geometry of such a filter must be executed with high precision to produce a filter with a good quality factor and effective selectivity. Typical dimensional tolerances may be on the order of thousandths of an inch or less. Such filters are conventionally manufactured by hand assembly of multiple individually machined parts, a slow and expensive process.

Additive Manufacturing (AM) is quickly gaining popularity in many industries as a method of rapid production at relatively low cost. AM, sometimes known as 3D printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often the raw material is in the form of granules or powder, applied as a layer and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include, for example, thermoplastic polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM) among others.

Conventional part designs used for machining or other subtractive manufacturing may be inefficient or even unworkable for AM. Depending on the process and material used, unsupported features may collapse, delicate features may be rendered with insufficient clarity, and/or warping and cracking may occur. New designs maintaining functionality of conventional parts while enabling efficient use of AM methods are needed.

SUMMARY

The present disclosure provides systems, apparatuses, and methods relating to radio frequency (RF) filters. In some examples, an RF filter apparatus may include an elongate hollow body portion having an inner side and an outer side. The apparatus may further include an iris structure on the inner side of the body portion and a stiffening structure on the outer side of the body portion. The stiffening structure may be aligned with the iris structure. In some examples, the elongate hollow body portion may be additively manufactured.

In some examples, a method of manufacturing an RF filter may include printing an elongate hollow body portion configured to receive radio frequency signals. The elongate body portion may have an outer peripheral side portion supported by an external lattice array.

Features, functions, and advantages may be achieved independently in various examples of the present disclosure, or may be combined in yet other examples, further details of which can be seen with reference to the following description and drawings.

DETAILED DESCRIPTION

Various aspects and examples of an additively manufactured radio frequency (RF) filter, as well as related methods, are described below and illustrated in the associated drawings. Unless otherwise specified, an RF filter in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a radio frequency (RF) filter in accordance with the present teachings includes an additively manufactured structure and a conductive material. An RF filter may also be referred to as a filter device and/or a filter component. The RF filter may be configured to receive signals in the radio frequency band and to transmit, or pass, a subset of frequencies.

An RF filter in accordance with the present teaching includes a body portion with a stiffening structure. The body portion may be tubular, elongate, and/or hollow. The stiffening structure is disposed on an outer side of the body portion and may be described as peripherally surrounding some or all of the body portion. The body portion may be configured to form a channel for filtering RF signals and may have a cross-sectional shape appropriate to desired filtering.

The RF filter may further include an internal structure, having a geometry configured to facilitate filtering of radio frequency electromagnetic waves. The internal structure may be formed on an inner surface or side of the body portion. Examples of an internal structure include, but are not limited to, a septum, an iris, a dipole, a tuning screw, a post filter, and/or any combination thereof.

The RF filter includes a conductive material, which may be a laser sintered metal. In particular, the inner surface or side of the body portion is formed of a conductive material. In some examples, the filter may include aluminum, copper, titanium, and/or an alloy thereof. The filter may include multiple materials, or may be produced from a single material. Conductivity, elasticity, density, and temperature sensitivity, along with other factors, may be considered in selecting a material or combination of materials for the RF filter. Appropriate or desirable materials may depend on an intended application of the filter, and a selected additive manufacturing method.

The RF filter has a manufacturing orientation defined by a printing axis, which may be perpendicular to an elongate axis of the body portion. The filter may comprise a plurality of layers, each layer being generally perpendicular to the printing axis. Each layer may be thin and planar, and fused to or otherwise cohesive with adjacent layers. Variation from one layer to an adjacent layer may be limited. That is, dimensions of the RF filter may change gradually along the printing axis.

The filter may include no abrupt overhangs, where an abrupt overhang may be described as any downward-facing surface forming an angle of greater than approximately 45 degrees or greater than approximately 50 degrees with the printing axis. All features of the RF filter may therefore be printed without need for secondary supports. Secondary supports may be understood by one skilled in the art of additive manufacture as supporting structures not included in the part design, which are added during manufacture to facilitate printing of non-self-supporting features such as overhangs or local minima, and which are configured for removal subsequent to printing. Secondary support may also be described as non-flight material on additively manufactured parts for flight applications such as aircraft or satellites.

Referring again to the RF filter, the stiffening structure on the outer side of the body portion may include a lattice. The lattice may be formed by diagonal, horizontal, and/or vertical ribs. The lattice may be described as forming a plurality of diamond shaped and/or triangular openings. The lattice stiffening structure may also be described as a first plurality of parallel linear structures and a second plurality of parallel linear structures intersecting the first plurality.

The stiffening structure may be configured to increase a structural strength of the body portion. The RF filter may thereby have a positive structural margin and/or meet a selected stiffness requirement. Such increased strength may also allow a thickness of one or more walls of the body portion to be decreased, thereby reducing material weight and manufacturing time.

The stiffening structure may be configured to maintain a rectangular shape, a circular shape, or any desired shape of the body portion through additive manufacture of the RF filter. The stiffening structure may also facilitate a stable geometry of the filter and reduce warping and/or thermal distortion during manufacturing processes. Manufactured filters may therefore have consistently low geometric profile deviations from a Computer Aided Design (CAD) nominal specification.

The stiffening structure may be shaped and/or disposed so as to provide targeted reinforcement in selected areas of the body portion while limiting overall weight of the stiffening structure. Selected areas may include regions prone to thermal distortion or where the geometry of the body portion does not provide reinforcement. For example, ribs of a lattice on a planar wall may taper to an increased height away from corners of the body portion. The stiffening structure may also be aligned with and/or strategically located relative to an internal structure of the RF filter. The stiffening structure may be thereby configured to benefit from innate stiffening properties of the geometry of the internal structure. For example, one or more horizontal ribs of a lattice may be aligned with an iris structure in the filter.

The RF filter may further include end caps on opposing ends of the body portion. When additively manufactured, the end caps may include close-out structures obstructing the RF channel or central aperture of the filter. Subsequent to printing, the close-out structures may be machined off of the RF filter, thereby opening the RF channel and providing a precise interface surface. The end caps may be further configured by printing and/or machining for connection to other structures. For example, the end caps may have a shape appropriate for mounting to an antenna, such that the filter is operatively connected to the antenna. In some examples, the RF filter may be designed to have an equivalent functionality as an existing filter design and may be configured to connect to a generally matching electrical system as the existing filter design.

The RF filter may be partially or entirely unitary. In other words, the body portion, internal structure, stiffening structure, end caps and/or any other portions of the filter may comprise a single structure. The RF filter may be additively manufactured in one process, without need for assembly of separate parts. The antenna component may also be manufactured without secondary supports that require removal after manufacture.

The RF filter may have improved reliability, as a result of unitary construction. Failure modes related to connection or interaction of parts may be eliminated. For example, the filter may not include bolts that may loosen under vibration, shims that shift under load, or tuning screws that alter tuning during transportation. Generally, potential for operational complications may be reduced for a filter comprising fewer components.

The RF filter may have a geometry configured to be repeatable. In other words, the geometry of the filter may be such that when multiple copies of the filter are manufactured, each copy measures within a desired tolerance of the original design. In some examples, the desired tolerance may be 1 thousandths of an inch (mil), may be 10 mil, or may be any appropriate size. Manufactured copies may also be true to shape. For example, a wall designed to be planar may be consistently printed without warping.

EXAMPLES, COMPONENTS, AND ALTERNATIVES

The following sections describe selected aspects of exemplary radio frequency (RF) filters as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative RF Filter

Figure 1:
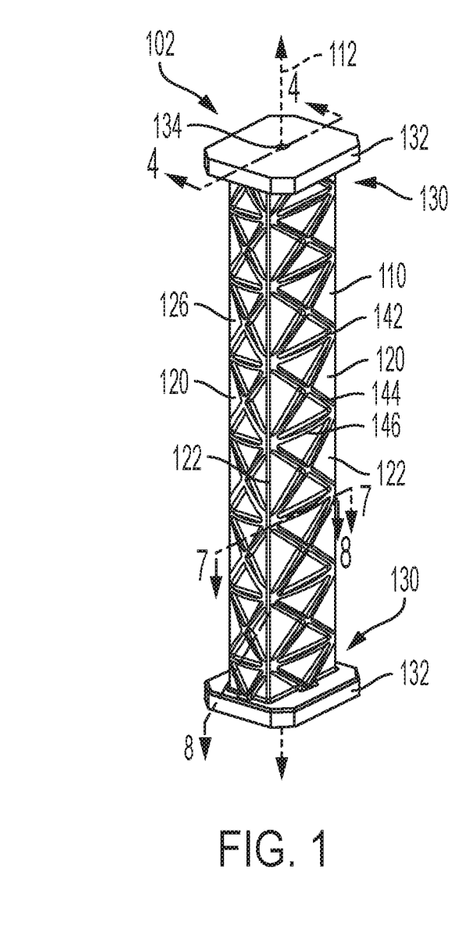
FIG. 1 is an isometric view of an illustrative additively manufactured RF filter in accordance with aspects of the present disclosure, as printed.
Figure 2:
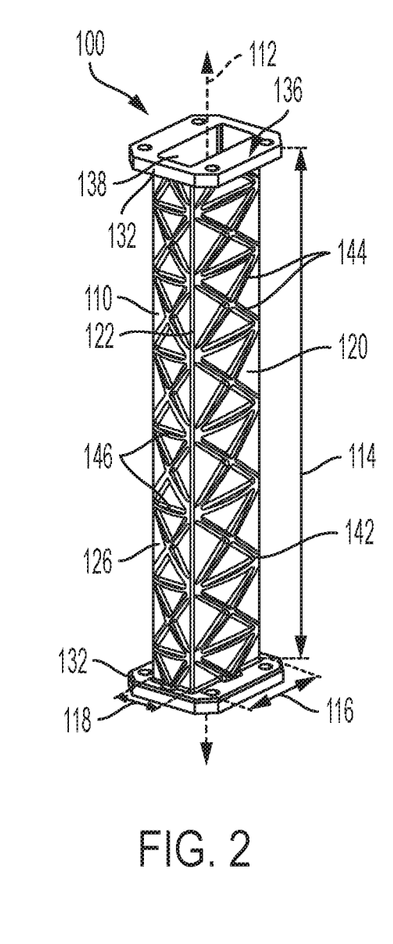
FIG. 2 is an isometric view of the RF filter of FIG. 1, after post-processing.

As shown in FIGS. 1-7, this section describes an illustrative RF filter 100. Filter 100 is an example of an additively manufactured filter, described above. FIG. 1 depicts the filter after additive manufacturing and prior to machine finishing. The depicted as-printed form of the filter may be referred to as an additively manufactured blank 102 for filter 100. FIG. 2 depicts the finished filter 100, after machining.

As shown in FIGS. 1 and 2, filter 100 includes a hollow rectangular body 110. The body may also be described as an elongate body portion, a rectangular tube, and/or a waveguide structure. Body 110 has an elongate or long axis 112 and a rectangular cross-sectional shape perpendicular to the long axis. The body may be described as having a length 114 along axis 112, and a width 116 and depth 118 perpendicular to the axis.

Body 110 includes four planar walls 120, each pair of adjacent walls being joined at a corner 122. Each wall has an outer surface and an inner surface. Together the outer surfaces of walls 120 form an outer side 126 of body 110, and the inner surfaces of the walls form an inner side 128 of the body. Both outer side 126 and inner side 128 have a rectangular cross-sectional shape. Body 110 may be described as having a rectangular primary cavity 140, defined by inner side 128 of the body.

In some examples, body 110 may have a circular cross-sectional shape, or any other effective cross-sectional shape. The body may include one curved wall, or any effective number of flat or curved walls. The cross-sectional shape of inner side 128 of body 110 may be selected according to desired electromagnetic properties of filter 100. The cross-sectional shape of outer side 126 of body 110 may be selected to provide effective structure for the body based on the inner cross-sectional shape of the body. Matching the outer cross-sectional shape to the inner cross-sectional shape may allow minimization of the thickness of the walls of the body.

Body 110 has first and second opposing ends 130. Filter 100 includes an end-cap 132 on body 110 at each end 130. End caps 132 are also rectangular, but with greater width and depth than body 110. As shown in FIG. 1, end caps 132 of blank 102 are closed except for a small powder hole 134. The powder hole may be configured to allow removal of excess powder or other material accumulated inside body 110 during additive manufacturing.

End caps 132 may provide structural support for ends 130 during manufacture, including processes such as printing and cooling. Such support may help to maintain the rectangular cross-sectional shape of primary cavity 140 and the planar form of walls 120. Powder hole 134 may be sufficiently small as not to interfere with such support, while still allowing efficient removal of excess manufacturing material.

End caps 132 may also function as interface and/or mounting structures for filter 100. For example, one of end caps 132 may be mounted to an antenna. To achieve a precise interface, an end surface of each end cap 132 of blank 102 may be machined to form an interface surface 136 on finished filter 100. Fastener holes and/or other connection features may also be machined into end caps 132. Preparation of end caps 132 for interface and/or mounting may constitute the only machining and/or finishing required for blank 102.

Primary cavity 140 extends into end caps 132 such that machining interface surface 136 also creates an interface aperture 138, as shown in FIG. 2. See description of FIG. 4 below for further details. Such positioning of the primary cavity may allow end caps 132 to provide reinforcement during printing and cooling, then provide a continuous aperture through body 110 after machining, without requiring additional machining work.

Filter 100 further includes a stiffening structure 142 on outer side 126 of body 110. In the present example, stiffening structure 142 is a lattice of diagonal ribs 144 and horizontal ribs 146. The lattice may also be described as a mesh, a grid, and/or a truss. Ribs 144 and 146 may also be described as stiffeners, braces, and/or linear projections from walls 120.

Each diagonal rib 144 and horizontal rib 146 extends across a wall 120 of body portion 110, between two adjacent corners 122. Each rib extends parallel to the corresponding wall, and projects out perpendicular to the wall. Each diagonal rib crosses exactly one other diagonal rib. The horizontal ribs 146 and diagonal ribs 144 coincide at corners 122, forming junctions of four diagonal ribs and two horizontal ribs. Each diagonal rib may also be described as extending between two adjacent horizontal ribs.

Horizontal ribs 146 are spaced along the length of body portion 110 and may be described as forming multiple boxes on each wall 120. Each box includes two intersecting diagonal ribs 144. Horizontal ribs 146 are spaced according to an internal structure of filter 100, shown in FIG. 3 and described below. Proximate each end 130 of body portion 110, the pattern of the lattice differs. The end portions may be described has having a half box, with two diagonal ribs 144 meeting at a center point of wall 120 and connected to the adjacent end cap 132.

Figure 3:
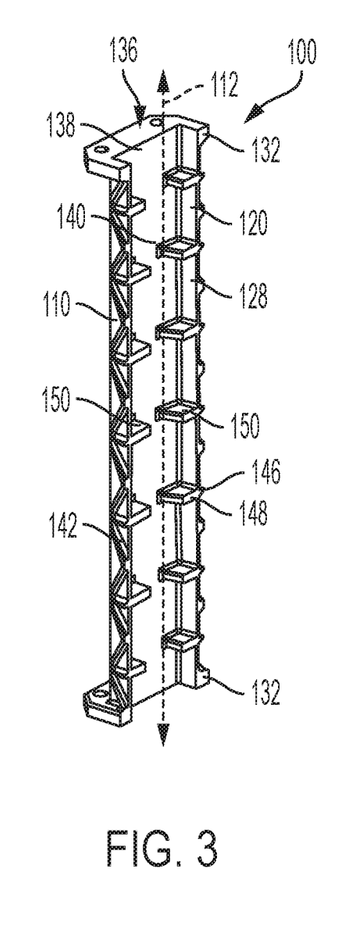
FIG. 3 is an isometric cross-sectional view of the RF filter of FIG. 2, along line 4-4.

FIG. 3 is a cutaway view of filter 100, showing an internal structure comprising a plurality of irises 148. Each iris is formed by a pair of bulkheads 150 extending from inner side 128 of body 110 into primary cavity 140. The irises may be described as dividing primary cavity 140 into a plurality of resonant cavities. Each horizontal rib 146 of the stiffening structure 142 is aligned with one of irises 148. As a result, each box of the lattice is aligned with a resonant cavity. Aligning elements of the lattice with irises 148 may allow stiffening structure 142 to take advantage of and/or benefit from the innate stiffening properties of the irises.

The iris dimensions and spacing between irises may be selected according to desired functional properties of RF filter 100. Spacing of horizontal ribs 146 may be selected to match irises 148. Diagonal ribs 144 may be disposed according to the location of the horizontal ribs. For instance, the angle of a diagonal rib relative to long axis 112 of the filter depends on the distance between the adjacent corners 122 and the spacing between the adjacent horizontal ribs 146.

Stiffening structure 142 may be configured according to the geometry of body 110 and irises 148. In the present example, body 110 includes corners 122 and ribs 144, 146 extend between corners. In another example, body 110 may be cylindrical and horizontal ribs 146 may fully encircle the body. In some examples, the lattice may include vertical ribs, diagonal ribs may intersect multiple horizontal and/or other diagonal ribs, or any effective pattern may be formed. Including triangular shapes, diamond shapes, and/or other truss patterns in the stiffening structure may provide more effective stiffening.

Figure 4:
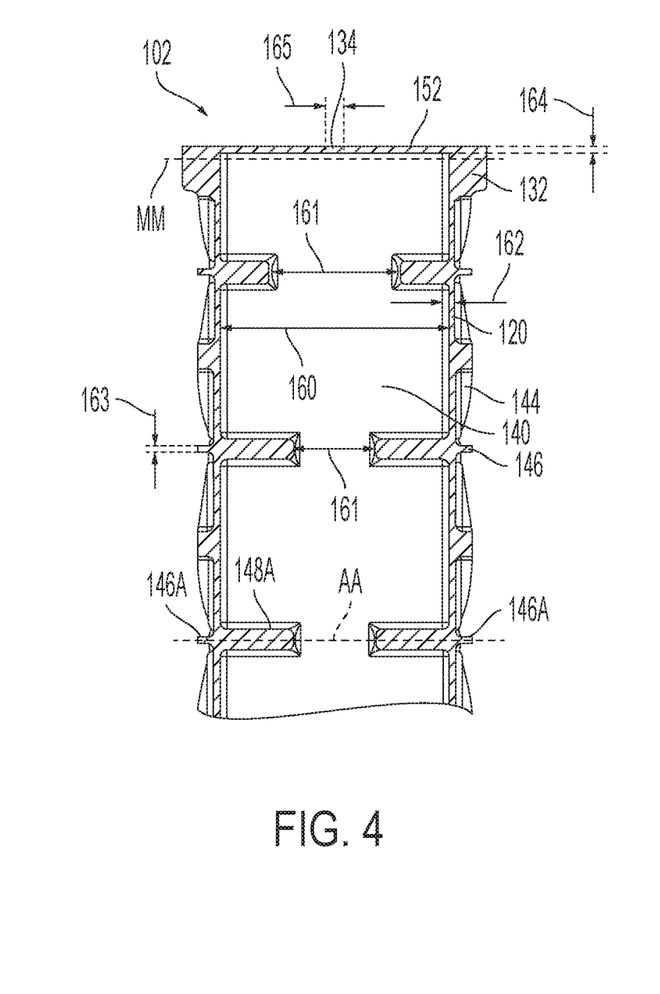
FIG. 4 is a cross-sectional view of a top end of the RF filter of FIG. 1, along line 4-4.

FIG. 4 is a partial cross-sectional view of additively manufactured blank 102 of filter 100, along line 4-4 in FIG. 1. Alignment of horizontal ribs 146 and irises 148 is more clearly shown. For example, two horizontal ribs 146A are shown aligned with an iris 148A, along line AA. Line AA lies in a plane perpendicular to long axis 112 (see FIG. 1). In addition to the depicted horizontal ribs 146A, a horizontal rib on each of the other two walls 120 are aligned in the same plane. Horizontal ribs 146 are similarly aligned with each iris 148. In other words, four horizontal ribs 146, one rib on each of walls 120, are aligned with each iris 148 in a plane perpendicular to the long axis of the filter.

Primary cavity 140 has a width 160 defined between walls 120, which remains constant along the length of body 110. Bulkheads 150 of each iris 148 extend into primary cavity 140 from walls 120, partially obstructing the cavity. Each iris has an aperture between bulkheads 150, with a width 161. Aperture width 161 may vary between irises. Dimensions of primary cavity 140 and irises 148 may be selected according to designed electromagnetic properties of filter 100.

Each wall 120 has a thickness 162. In the present example, all four walls have the same thickness. While walls 120 may have different thicknesses or varying thicknesses, consistent wall thickness throughout body 110 may facilitate consistent, accurate manufacture. Stiffening structure 142 may reinforce body 110 such that wall thickness 162 can be minimized.

Each rib 144, 146 similarly has a thickness 163. In the present example, all ribs including diagonal ribs 144 and horizontal ribs 146 have the same thickness and a consistent thickness throughout. A height, or projection of each rib relative to the corresponding wall varies however, as discussed further with reference to FIGS. 6 and 7 below.

In the depicted example, filter 100 has an overall length of approximately nine inches. Wall thickness 162 is approximately 30 thousandths of an inch (mil) and rib thickness 163 is also approximately 30 mil. Similar wall and rib thicknesses may be appropriate for filters of greater length, but thicknesses may be varied according to the width and/or depth of the filter. Depending on the additive manufacturing technique used to produce the filter, thickness of features may be limited by a print resolution or similar property.

In FIG. 4, only one of ends 130 of body 110 and one of end caps is shown. The other end 130 and end cap 132 may be understood to match the depicted end and end-cap. In some examples, powder hole 134 may be omitted from one of the end caps. As noted above, primary cavity 140 extends into end cap 132. The end cap may also be described as hollow, with a distal close-out structure 152. Close-out 152 comprises a planar expanse that obstructs primary cavity 140, with a thickness 164. In the present example, the close-out has a thickness of 30 mil.

Powder hole 134 extends through close-out 152, establishing fluid communication between primary cavity 140 and the exterior of additively manufactured blank 102. In the present example, the powder hole is square, with a width 165. Width 165 is smaller than primary cavity width 160, and may be described as less than half or less than a quarter of the primary cavity width. In some examples, the powder hole may be shaped to interface with powder extraction tool and/or may have any effective shape. As discussed with reference to FIG. 5 below, a square shape may facilitate accurate printing of powder hole 134.

Close-out 152 and powder hole 134 are removed when blank 102 is machined to produce finished filter 100. The blank may be machined along line MM, to remove the close-out. In the present example, approximately 50 mil of material is removed. Due to the structure of end cap 132, machining along line MM both opens a continuous channel through the filter and creates a smooth interface surface. Once machined, end cap 132 may be described as forming a continuous extension of inner side 128 of body 110 and of primary cavity 140.

Figure 5:
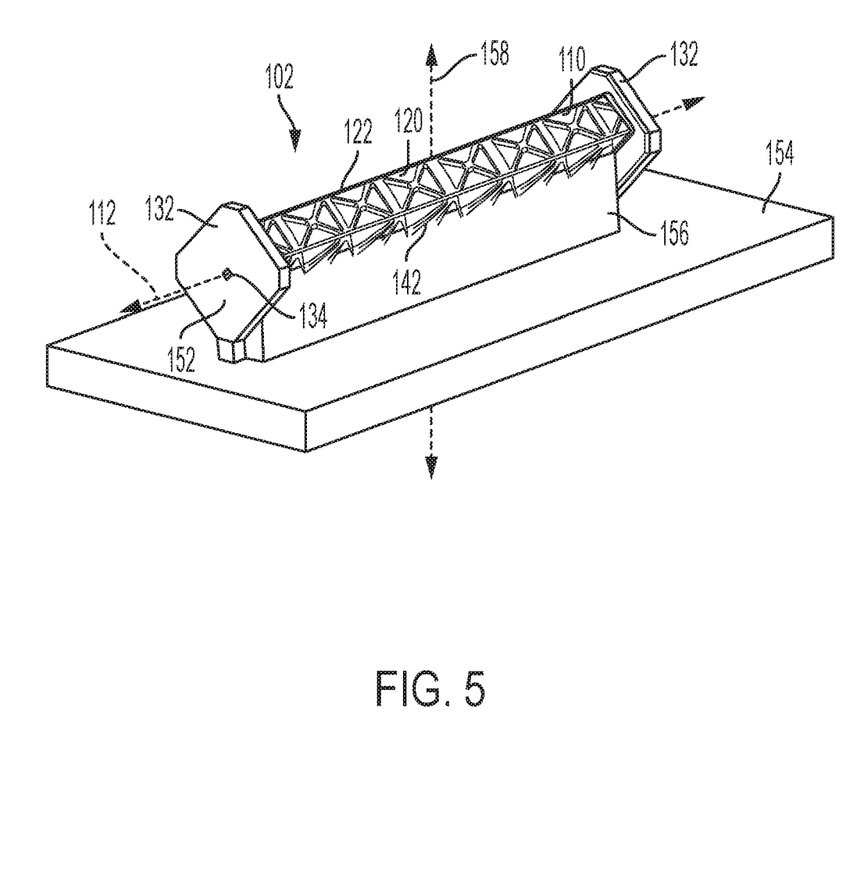
FIG. 5 is an isometric view of the RF filter of FIG. 1, as printed in a first build orientation.

FIG. 5 is an isometric view of additively manufactured blank 102, immediately after printing. Blank 102 for filter 100 may be manufactured by Direct Metal Laser Sintering (DMLS), or any effective additive manufacturing process. In the present example, the filter comprises a sintered aluminum alloy, specifically AlSi10Mg Type II. The alloy may provide good strength, hardness, and high load tolerance, along with low weight. In some examples, blank 102 may be printed of a non-conductive and/or non-metallic material such as a polymer. In such examples, post-processing methods such as plating with conductive metals may be used to achieve desired electromagnetic properties of filter 100.

Blank 102 for filter 100 is unitary. That is, the blank is a single piece, including body 110, stiffening structure 142, and irises 148 (See FIG. 3). The single piece blank may reduce and/or eliminate assembly for filter 100, and may also improve reliability of and/or reduce failure modes for the filter.

As shown in FIG. 5, blank 102 is supported on a build plate 154 by sacrificial primary supports 156. The blank is supported in what may be referred to as a first build orientation, defined by a build axis 158. The build axis may be aligned with a vertical direction or print direction of additive manufacturing equipment used to print blank 102.

Build axis 158 is perpendicular to long axis 112 of the filter and extends through a corner 122 of body 110. In other words, in the build orientation the length of body 110 is parallel to build plate 154. One of corners 122 is closest to the build plate, with the opposing corner disposed vertically above. The opposing corner may be stacked immediately above the corner closest to the build plate or may be out of vertical alignment. Body 110 is oriented such that each wall 120 forms an angle of at least forty five degrees relative to the horizontal plane of build plate 154. Such an angle may allow the walls to be printed without need for secondary supports, may preserve print resolution of stiffening structure 142 on the walls facing build plate 154, and keep surface roughness within an acceptable range.

Primary supports 156 are disposed under the corner 122 closest to build plate 154, and a corresponding corner of each end cap 132. The primary supports may contact blank 102 only on the corner, or may make limited contact with adjacent walls 120. Primary supports 156 are configured for easy removal after printing. Limited surface roughness which may result from removal of the primary supports will also be on outer side 126 of body 110, where such roughness would not impact filter performance.

Although not depicted in FIG. 5, irises 148 shown in FIGS. 3 and 4 are also oriented to allow printing without secondary supports. In the build orientation, each iris bulkhead 150 extends in a plane perpendicular to build plate 154. No edge of a bulkhead forms an angle of less than forty five degrees relative to the build plate. As shown in FIG. 4, such orientation allows bulkheads 150 to extend perpendicular to inner side 128 of body 110, without chamfering or other additional material. Such orientation may also prevent surface roughness from reaching levels sufficient to impact filter performance.

Referring again to FIG. 5, as mentioned above powder hole 134 is square. The powder hole is aligned with end cap 132 such that each side of the hole forms an angle of approximately forty five degrees relative to the horizontal plane of build plate 154. Powder hole 134 may therefore be printed accurately and without distortion, ensuring effective access to the interior of additively manufactured blank 102 for powder removal.

Figure 6:
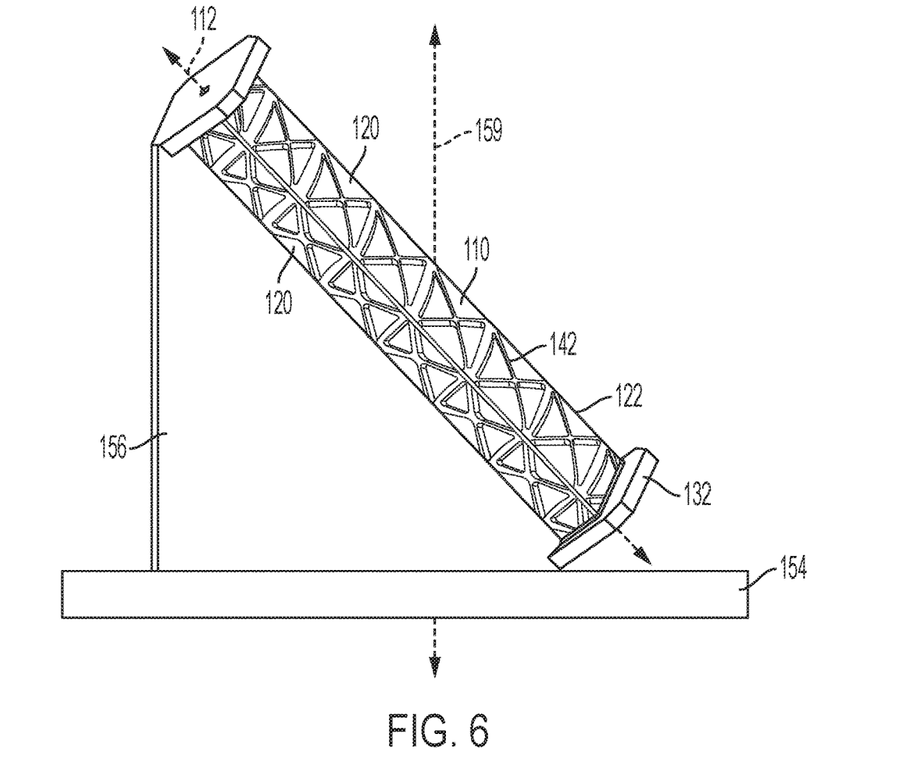
FIG. 6 is an isometric of the RF filter of FIG. 1, as printed in a second build orientation.

In FIG. 6, blank 102 is shown supported on build plate 154 by sacrificial primary supports 156 in what may be referred to as a second build orientation. The build orientation is defined by a build axis 159. The build axis may be aligned with a vertical direction or print direction of additive manufacturing equipment used to print blank 102.

Build axis 159 forms an angle of approximately forty five degrees with long axis 112 of the filter, and with build plate 154. In other words, in the orientation defined by build axis 159, the length of body 110 is angled relative to build plate 154. One of corners 122 is closest to the build plate, with the opposing corner stacked vertically above.

Similarly to the orientation defined by build axis 158, body 110 is oriented such that the walls and irises of the filter can be printed without need for secondary supports. The build orientation depicted in FIG. 6 may require additional material for primary supports 156, but blank 102 may occupy less surface area on build plate 154, therefore allowing a greater number of blanks to be printed simultaneously with a particular set of additive manufacturing equipment. The depicted orientation may also reduce a total surface area of each printed layer, minimizing residual stress introduced during printing.

In some examples, other build orientations may be appropriate. For example, a cylindrical body 110 may be most effectively printed with the long axis of the body aligned with the build axis, to prevent distortion of the circular shape. However, such changes in orientation may impact other features of the filter and require additional changes. For example, a cylindrical filter printed in the orientation suggested above may require each iris to be supported by a chamfer structure.

Figure 7:
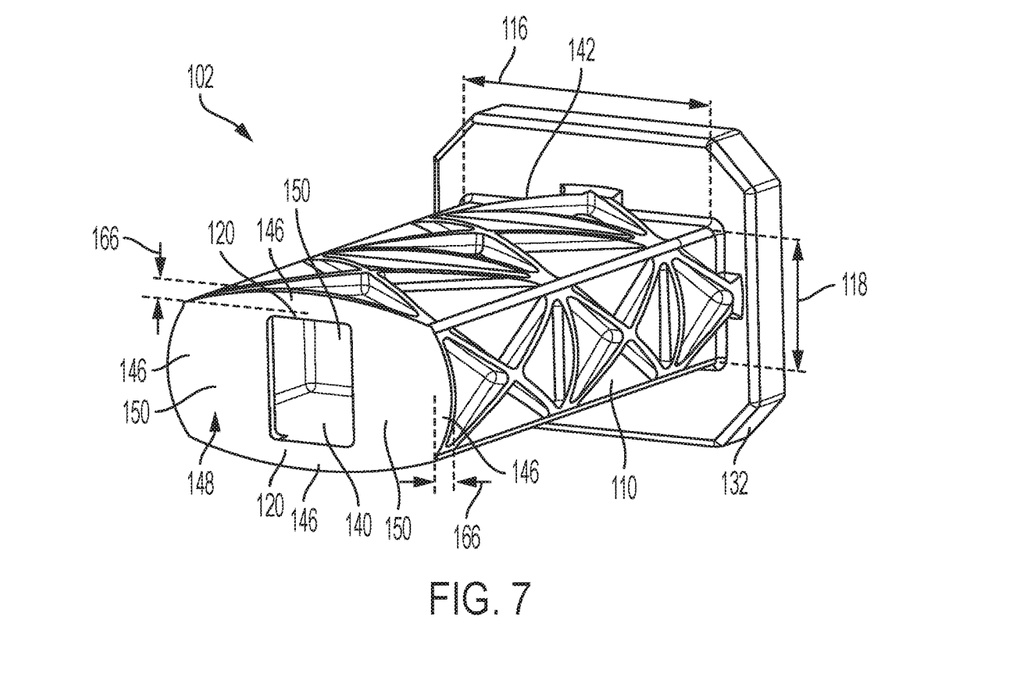
FIG. 7 is an isometric cross-sectional view of the RF filter of FIG. 1, along line 7-7.
Figure 8:
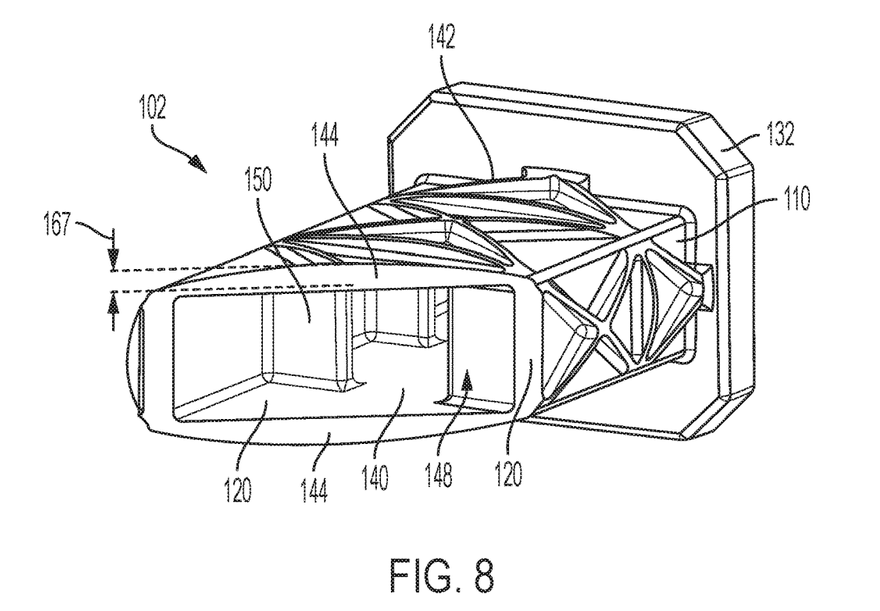
FIG. 8 is an isometric cross-sectional view of the RF filter of FIG. 1, along line 8-8.

FIGS. 7 and 8 are cutaway views of additively manufactured blank 102. FIG. 7 is cut through an iris and corresponding set of four horizontal ribs 146, as indicated by line 7-7 in FIG. 1, and FIG. 8 is cut through an opposing pair of diagonal ribs 144, as indicated by line 8-8 in FIG. 1. In these FIGS., a tapered or arched shape of ribs 144, 146 can be seen.

As shown in FIG. 7, each horizontal rib 146 has a varying height with a maximum rib height 166 proximate the center of the corresponding wall 120. Height 166 may also be referred to as extent of projection from wall 120, thickness, and/or length. The height of each horizontal rib tapers from nothing or no height at corners 122, to maximum height 166 proximate the center of the wall. Maximum height 166 is the same for each horizontal rib 146, but a slope of the taper and overall arch shape differ between horizontal ribs extending along width 116 of body 110 and depth 118 of the body.

As shown in FIG. 8, each diagonal rib 144 has a similarly varying height, with a maximum rib height 167 proximate the center of the corresponding wall 120 and an intersection with another diagonal rib. Height 167 may also be referred to as extent of projection from wall 120, thickness, and/or length. The height of each vertical rib tapers from nothing or no height at corners 122, to maximum height 167 proximate the center of the wall.

In the present example, maximum horizontal rib height 166 and maximum diagonal rib height 167 are both approximately 80 mil. In some examples, horizontal ribs 146 and diagonal ribs 144 may have different maximum heights, may have different taper profiles, and/or rib heights may vary across the length of body 110. Maximum rib heights 166, 167 may be between 50 and 100 mil and/or may be selected according to other dimensions of the filter such as wall thickness 162 (see FIG. 4), horizontal rib spacing, or body width 116.

Such tapered and/or arched shapes of horizontal ribs 146 and diagonal ribs 144 may provide stiffening at strategic areas of body 110, while limiting overall material volume and weight. Corners 122 provide intrinsic geometric stiffening to body 110, with walls 120 weakest along the center. Therefore, positioning maximum height 166, 167 of the ribs provides stiffening where needed, while reducing rib height to nothing at corners 122 prevents wasted material. Additionally, reducing rib height proximate corners 122 may provide a clear attachment point for primary supports, thereby facilitating easy removal of the primary supports after printing.

Figure 9:
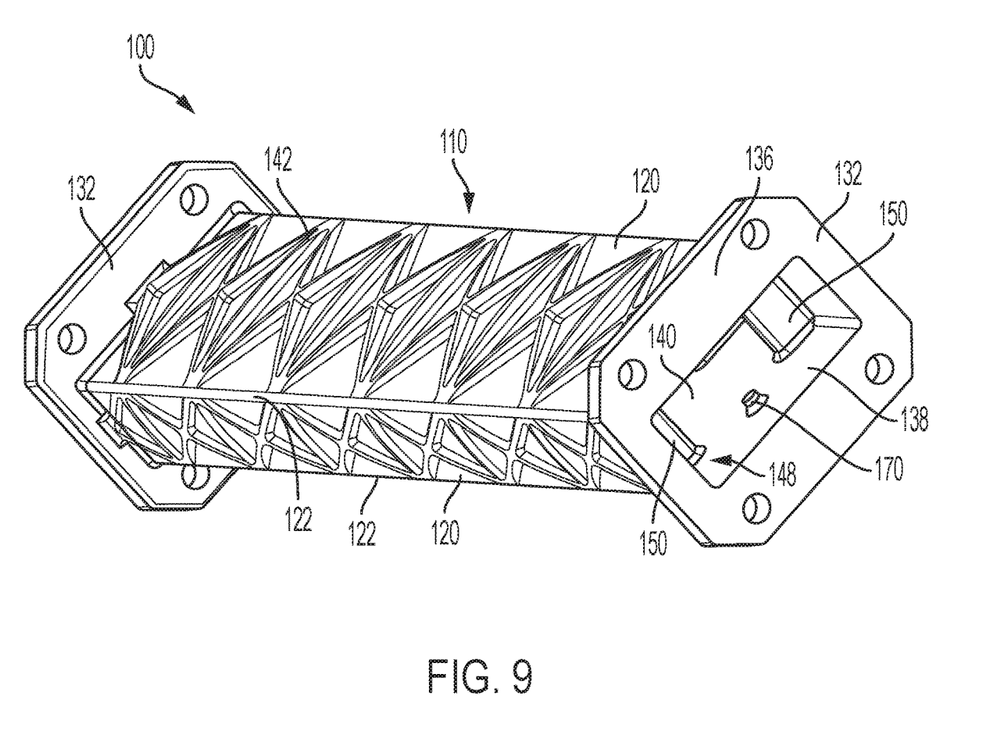
FIG. 9 is an isometric view of the RF filter of FIG. 1, further including a calibration feature.

In FIG. 9, an isometric view of interface aperture 138 and primary cavity 140, filter 100 is depicted further including an optional calibration feature 170. In the depicted example, calibration feature 170 is a single boss extending from inner side 128 of body 110. Calibration feature 170 may also be described as extending into primary cavity 140 from one of walls 120, partially obstructing the cavity. In some examples, the calibration feature may further include any effective number and/or pattern of additional bosses and/or other structures extending from walls 120 into primary cavity 140.

The boss of calibration feature 170 extends perpendicular to the surface of the respective wall 120, and in a plane parallel to bulkheads 150 of irises 148. Similarly to bulkheads 150, each boss or other structure of calibration feature 170 may form an angle of at least 45 degrees with a build plate in the first or second build orientations, and may therefore be printed without secondary supports or significant chamfering.

Calibration feature 170 may also be described as an integrated tuning feature, adjustment feature, and/or precision filtering feature. The calibration feature may be configured to provide fine adjustment of the filtering functionality of filter 100, similar to the adjustment allowed by a tuning screw. Size, shape, and geometry of calibration feature 170 may be selected according to a desired adjustment to filter 100. For example, the boss depicted in FIG. 9 may have a geometry selected to configure filter 100 for operation in a low-atmosphere environment.

Calibration feature 170 is unitary with walls 120 and body 110, and printed as part of additively manufactured blank 102. In some examples, the feature may be machined or otherwise post-processed to achieve highly precise effects on the RF properties of filter 100. In some examples, the feature may be shaped to provide a desired adjustment without post-processing.

B. Illustrative Method of Additive Manufacture

Figure 10:
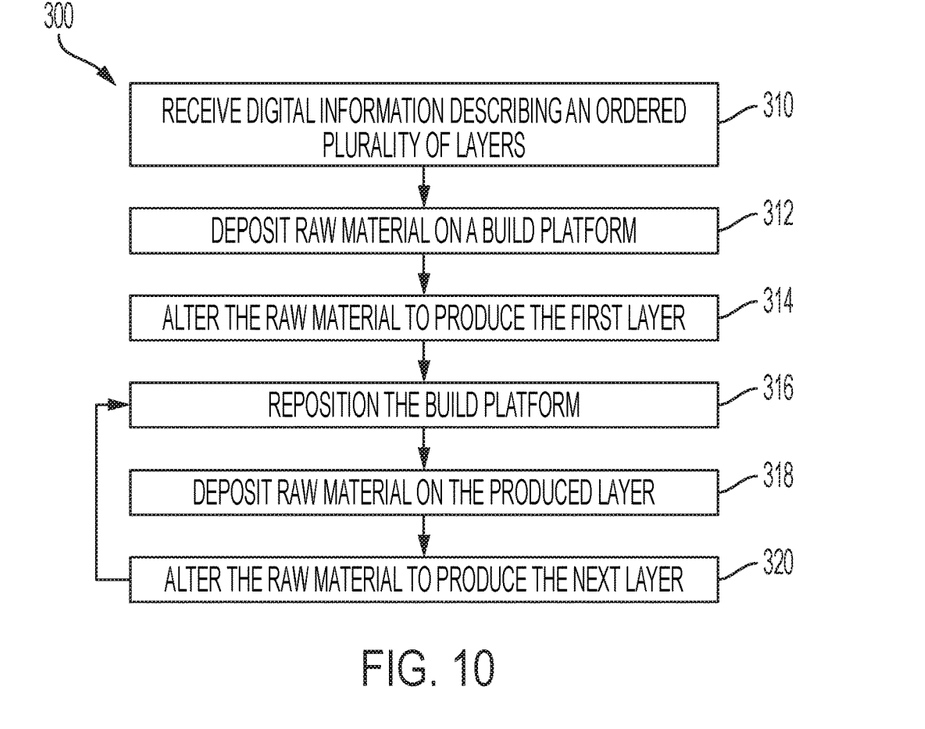
FIG. 10 is a flow chart depicting steps of an illustrative method of additive manufacture according to the present teachings.

This section describes steps of an illustrative method for additive manufacture of a workpiece; see FIG. 10. Aspects of an illustrative additive manufacturing device depicted in FIG. 11 may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 300 are described below and depicted in FIG. 10, the steps need not necessarily all be performed, and in some cases may be performed simultaneously or in a different order than the order shown.

Figure 11:
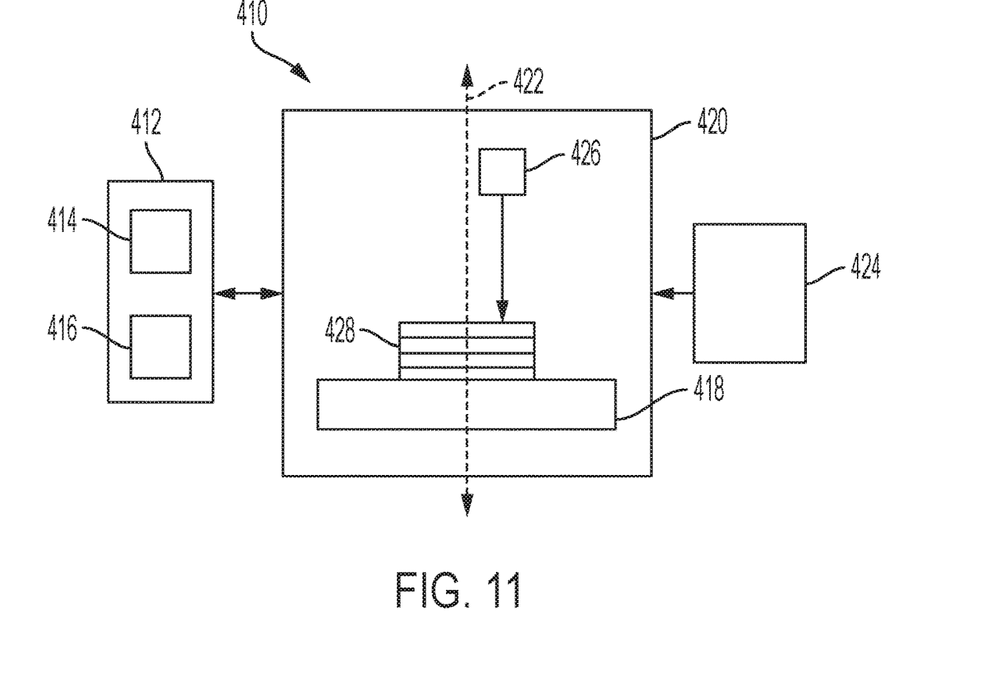
FIG. 11 is a schematic diagram of an illustrative additive manufacturing apparatus as described herein.

At step 310, digital information describing an ordered plurality of layers is received. The digital information may be received by a computer controller 412 of an additive manufacturing device 410 as depicted in FIG. 11. The additive manufacturing device may also be referred to as a printer, or a fabricator. Computer controller 412 may comprise any data processing system configured to receive digital design information and control functions of printer 410. The illustrative computer controller shown in FIG. 11 includes a processor 414 for controlling printer functions and memory 416 for storing received data.

The received information may include geometric data and/or design details for a plurality of two-dimensional patterns that constitute layers of a three-dimensional object, where the three-dimensional object is a workpiece 428 to be manufactured. The layers may also be described as cross-sections or slices. The plurality of layers is ordered, such that the layers may be numbered or organized from a first layer to a last layer.

Step 312 of method 300 includes depositing raw material on a build platform 418 located in a building environment 420 of printer 410. The build platform may comprise a support moveable by computer controller 412 along a manufacturing axis 422. The build platform may have a planar surface perpendicular to manufacturing axis 422.

The raw material may be any material appropriate to additive manufacturing, typically a fluid or powder and including but not limited to photopolymer resin, thermoplastic, plaster, ceramic, and metal. The material may be distributed from a raw material source 424 such as a hopper, a tank, or a powder bed. For example, aluminum powder may be swept from a powder bed over build platform 418 by a brush arm actuated by computer controller 412.

The raw material may be distributed evenly over build platform 418, or may be deposited in a selected pattern. Depositing may be done under control of computer controller 412. In some examples, build platform 418 may be submerged in raw material and depositing may be accomplished by gravity or fluid pressure. In some examples, a print head 426 connected to raw material source 424 may deposit the raw material in a pattern corresponding to the first layer of the ordered plurality of layers.

At step 314, the raw material is altered to produce the first layer. In other words, a physical change is induced in the deposited material, according to the design information describing the first layer of the ordered plurality of layers and as directed by the computer controller 412, to realize the first layer as a physical object on the build platform.

The material may be acted on by a print head 426 of printer 410, controlled by computer controller 412. For example, the print head may include a laser that cures a photopolymer by exposure to light or sinters a metal powder by exposure to heat. The print head may be directed by computer controller 412 to follow a path delineated in the received digital information for the first layer, and/or a path calculated by processor 414 based on the received digital information.

Step 316 includes repositioning the build platform. In some examples, build platform 418 may start a selected distance from print head 426. The selected distance may be determined by the procedures performed by the print head. Subsequent to production of a layer, the build platform may be repositioned by computer controller 412 along manufacturing axis 422 away from print head 426 by the layer's thickness. That is, the build platform may be moved such that a top surface of the produced layer is the selected distance from print head 426.

In some examples, build platform 418 may start in alignment with another element of printer 410 such as a raw material distribution component. Subsequent to production of a layer, the build platform may be repositioned by computer controller 412 along manufacturing axis 422 such that a top surface of the produced layer is aligned with the other element of printer 410. In some examples, at step 316 print head 426 may be repositioned instead of or in addition to build platform 418. In some examples, step 316 may be skipped.

At step 318, raw material is deposited on the layer produced in the preceding step of method 300. As described for step 312, the raw material may be any appropriate material and may be deposited any appropriate manner. At step 320, the raw material is altered to produce the next layer as previously described for step 314.

Steps 316 through 320 may be repeated to produce each layer of the plurality of layers of the received digital information, until the last layer is produced. The produced first through last layers may then comprise workpiece 428 as described in the received digital information. The workpiece may be removed from the printer and post-processed as desired. For example, the workpiece may be machined from a build plate of the build platform, and then fine details or smooth surfaces may be further finished by machining or other methods.

C. Illustrative Method

Figure 12:
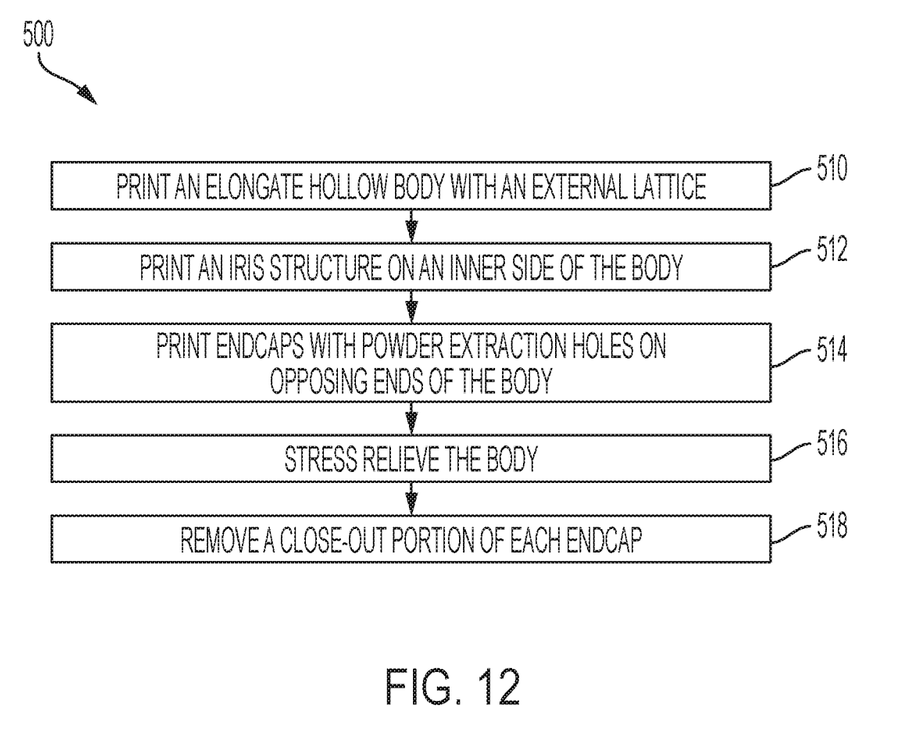
FIG. 12 is a flow chart depicting steps of an illustrative method of additively manufacturing an RF filter according to the present teachings.

This section describes steps of an illustrative method 500 for additively manufacturing an RF filter; see FIG. 12. Aspects of filters, additive manufacturing methods, or additive manufacturing devices described above may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 500 are described below and depicted in FIG. 12, the steps need not necessarily all be performed, and in some cases may be performed simultaneously or in a different order than the order shown.

At step 510, the method includes printing an elongate hollow body with an external lattice. The body may comprise a tube with a central aperture and may be configured to receive RF signals. Properties such as geometry and material of an inner side of the body may be configured according to desired electromagnetic properties of the body such as impedance and conductivity. The lattice may comprise a plurality of linear structures such as ribs or braces projecting from an external surface of the body. The lattice may be configured to stiffen, reinforce and/or buttress the body portion.

Step 512 includes printing an iris structure on an inner side of the body. The iris structure may include one or more projections into the central aperture of the body. The projections may extend perpendicular to the elongate axis of the body, and to the printing axis. In some examples, step 512 may include printing a plurality of iris structures spaced along the inner side of the body.

The irises may have spacings and aperture sizes selected according to desired filtering properties. For example, the irises may be selected to pass a selected band of frequencies. The printed iris and/or irises may be aligned with the external lattice of the body. For example, each iris may be co-planar with one or more horizontal ribs of the lattice. In some examples, additional or alternative structures such as posts may be printed on the inner side of the body, according to the desired filtering properties.

Step 514 includes printing end caps with powder extraction holes on opposing ends of the body. The end caps may be described as obstructing and/or closing the central aperture of the body. The end caps may be configured for mounting and/or interfacing with other components of an RF communications system. The end caps may also be configured to support and/or stiffen the opposing ends of the body during printing and/or subsequent steps of method 500.

Printing in steps 510-514 may be done according to an additive manufacturing method such as method 300 described above. In particular, printing may be done by Direct Metal Laser Sintering (DMLS) of an aluminum alloy powder. The body, external lattice, iris or irises, and end caps may be printed as a single unitary structure.

The elongate hollow body may have an elongate axis, the central aperture extending parallel to the elongate axis. The body may be printed in an orientation such that the elongate axis is perpendicular to a vertical direction or manufacturing axis of the additive manufacturing method. In some examples, the body may have four walls and a rectangular cross-sectional shape. In such examples, the body may be printed such that each wall forms an oblique angle with the printing axis. The walls may be oriented to form an angle of no more than forty five degrees with the printing axis. Steps 510-514 may be carried out without using secondary supports.

The powder extraction holes of the end caps may be configured to allow removal of excess material, subsequent to processing. For example, aluminum alloy powder may be vacuumed out of the body after DMLS printing. The powder extraction hole may be sized according to equipment used for extraction, which may depend on the selected method of additive manufacture.

At step 516, the method includes stress relieving the body. Stress relieving may include heating the body to a predetermined temperature below a transformation temperature of the material of the body, then cooling the body at a selected rate. Cooling may be accomplished by air quenching. Step 516 may include any appropriate heat treatments and/or any processes effective in relieving stresses introduced into the material of the body during the printing of steps 510-514. Stress relief may be performed prior to removing the body from a build plate or support structure of the additive manufacturing equipment.

Step 516 may additionally or alternatively include finishing processes appropriate to the selected material and additive manufacturing process used in steps 510-514. For example, when fused deposition modelling (FDM) of a material such as a polymer is used, step 516 may include cooling and/or curing of the polymer.

Step 518 includes removing a close-out portion of each end cap. The end caps printed in step 514 may include a central aperture or cavity aligned with the central aperture of the body, and a close-out portion obstruction the central aperture. The central aperture of the body may also be described as extending into each end cap. The close-out portion of each end cap may be a generally planar layer having a thickness. A layer of material having a thickness greater than the close-out portion thickness may be machined from each end cap. Step 518 may open the central aperture of each end cap, and thereby provide radio frequency access through the body. Step 518 may also provide a smooth, precise interface surface for connection to other structures.

In some examples, method 500 may further include additional post-processing steps. For example, the method may include machining connection features such as fastener holes into one or both end caps. For another example, method 500 may include refining the geometry of the inner side of the body using a smoothing process such as chemical milling.

For another example, method 500 may include coating the inner side of the body and the iris or irises in a conductive material. Coating may be performed using methods such as electroplating and/or immersion. Such coating may allow the body to be additively manufactured from a material that is light, inexpensive, and/or well suited to additive manufacture. For instance, the body may be printed from an aluminum alloy. The inner side of the body may then be coated in a material with desirable electromagnetic properties such as high conductivity strike and increased electrical conductivity skin effects, but which may be heavy, expensive, and/or unsuited to additive manufacture. For instance, the inner side of the body may be coated in nickel, copper, silver, and/or an alloy thereof.

Such coating may also allow the body to be printed of a non-conductive material. For example, FDM may be used to print the body from an inexpensive and light-weight polymer. The inner side of the body and the irises may then be coated in a conductive material such as copper to provide the desired electromagnetic properties.

Illustrative Combinations and Additional Examples

This section describes additional aspects and features of radio frequency filters, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A radio frequency filter apparatus, comprising:
an elongate hollow body portion having an inner side and an outer side, an iris structure on the inner side of the body portion, and a stiffening structure on the outer side of the body portion aligned with the iris structure.

A1. The apparatus of A0, wherein the body portion, iris structure and stiffening structure are additively manufactured as a single unit.

A2. The apparatus of A0 or A1, wherein the body portion has an elongate axis and a rectangular cross-sectional shape perpendicular to the elongate axis.

A3. The apparatus of any of A0-A2, wherein the body portion has an elongate axis and a circular cross-sectional shape perpendicular to the elongate axis.

A4. The apparatus of any of A0-A3, wherein the stiffening structure includes a lattice formed by diagonal ribs and horizontal ribs, one or more of the horizontal ribs being aligned with the iris structure on the inner side of the body portion.

A5. The apparatus of A4, wherein the body portion has four corner portions, each horizontal rib extending between two adjacent corner portions.

A6. The apparatus of A5, wherein each horizontal rib tapers to a maximum height in a middle section.

A7. The apparatus of any of A4-A6, wherein the body portion has four corner portions, each diagonal rib extending between two adjacent corner portions.

A8. The apparatus of A7, wherein each diagonal rib tapers to a maximum height in a middle section.

A9. The apparatus of A7 or A8, wherein each diagonal rib crosses one other diagonal rib between adjacent corner portions.

A10. The apparatus of A7 or A8, wherein each diagonal rib crosses multiple diagonal ribs between adjacent corner portions.

A11. The apparatus of any of A7-A10, wherein each diagonal rib forms an oblique angle with a horizontal rib.

A12. The apparatus of any of A7-A11, wherein each diagonal rib extends between adjacent horizontal ribs.

A13. The apparatus of any of A0-A12, further including a calibration structure on the inner side of the body portion.

A14. The apparatus of A13, wherein the calibration structure includes one or more bosses.

B0. A method of manufacturing a radio frequency filter, comprising:
printing an elongate hollow body portion configured to receive radio frequency signals, wherein the hollow body portion has an outer peripheral side portion supported by an external lattice array.

B1. The method of B0, further comprising printing an iris structure on an inner side of the hollow body portion aligned with portions of the external lattice array.

B2. The method of B1, wherein the external lattice array includes horizontal ribs aligned with the iris structure on the inner side of the hollow body portion.

B3. The method of any of B0-B2, wherein the printing step includes; depositing multiple layers of a material.

B4. The method of B3, wherein the body portion has an elongate axis and each layer of material is parallel to the elongate axis.

B5. The method of B3 or B4, wherein the body portion includes a planar wall and each layer of material forms an angle of at least forty five degrees with the planar wall.

B6. The method of any of B3-B5, wherein the material includes a sintered metal alloy.

B7. The method of any of B3-B6, wherein the material includes a polymer.

B8. The method of any of B3-B7, further including coating an inner side of the hollow body portion with a conductive material.

B9. The method of B8, wherein coating an inner side of the hollow body portion includes plating the inner side with a metal.

B10. The method of any of B0-B9, wherein the printing step is carried out without using secondary supports.

B11. The method of any of B0-B10, further comprising:
printing end cap structures on opposing end portions of the hollow body portion.

B12. The method of B11, further comprising:
providing a powder extraction hole in an end cap structure, wherein the hollow body portion has an inner diameter, the powder extraction hole having a smaller inner diameter than the inner diameter of the hollow body portion.

B13. The method of B11 or B12, further comprising:
removing close-out portions of the end cap structures, providing radio frequency access through the hollow body portion.

B14. The method of B13, further comprising:
performing a stress relief treatment on the hollow body portion prior to removing the close-out portions of the end cap structures.

B15. The method of B13, further comprising:
performing a stress relief treatment on the body portion prior to removing the body portion from a build plate.

B16. The method of B13, wherein providing radio frequency access includes exposing a primary cavity of the hollow body portion.

C0. A radio frequency filter apparatus, comprising:
an additively manufactured elongate hollow body portion having an inner side and an outer side, an iris structure on the inner side of the body portion, and a stiffening structure on the outer side of the body portion aligned with the iris structure.

Advantages, Features, and Benefits

The different examples of the radio frequency (RF) filter described herein provide several advantages over known solutions for filter design. For example, illustrative examples described herein allow manufacture of an RF filter without manual assembly.

Additionally, and among other benefits, illustrative examples described herein allow manufacture with minimal, straightforward machining and no hand finishing.

Additionally, and among other benefits, illustrative examples described herein allow a highly geometrically precise RF filter to be repeatably additively manufactured with minimal deviation from as-designed specifications.

Additionally, and among other benefits, illustrative examples described herein reduce material volume, thereby reducing weight, cost, and printing time.

No known system or device can perform these functions, particularly without need for secondary supports in the additive manufacturing process. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A radio frequency filter apparatus, comprising:
   an elongate hollow body portion having an elongate axis, an inner side, and an outer side,
   an iris structure on the inner side of the body portion, and
   a stiffening structure on the outer side of the body portion aligned with the iris structure,
   wherein the stiffening structure includes a lattice formed by diagonal ribs and horizontal ribs perpendicular to the elongate axis.

2. The apparatus of claim 1, wherein the body portion, iris structure and stiffening structure are additively manufactured as a single unit.

3. The apparatus of claim 1, wherein the body portion has a rectangular cross-sectional shape perpendicular to the elongate axis.

4. The apparatus of claim 1, wherein one or more of the horizontal ribs is aligned with the iris structure on the inner side of the body portion.

5. The apparatus of claim 1, wherein the body portion has four corner portions, each horizontal rib extending between two adjacent corner portions and each diagonal rib extending between two adjacent corner portions.

6. The apparatus of claim 5, wherein each horizontal rib tapers to a maximum height in a middle section.

7. The apparatus of claim 5, wherein each diagonal rib tapers to a maximum height in a middle section.

8. The apparatus of claim 5, wherein each diagonal rib crosses one other diagonal rib between adjacent corner portions.

9. The apparatus of claim 1, further including a calibration structure on the inner side of the body portion, the calibration structure including a boss.

10. The radio frequency filter apparatus of claim 1, wherein the lattice of the stiffening structure includes a repeating pattern of horizontal and diagonal ribs.

11. The apparatus of claim 1, wherein the body portion has planar walls, and the stiffening structure includes horizontal ribs on each planar wall.

12. The apparatus of claim 1, wherein the lattice of the stiffening structure includes a repeating pattern of the horizontal and diagonal ribs.

13. A radio frequency filter apparatus, comprising:
   an elongate hollow body portion having planar walls, an inner side, an outer side, and a long axis parallel to the planar walls,
   an iris structure on the inner side of the body portion, and
   a stiffening structure on the outer side of the body portion, including a horizontal rib aligned with the iris structure and perpendicular to the long axis of the elongate hollow body portion.

14. The radio frequency filter apparatus of claim 13, wherein the body portion, iris structure and stiffening structure are additively manufactured as a single unit.

15. The radio frequency filter apparatus of claim 13, wherein the stiffening structure includes horizontal ribs on each planar wall of the elongate hollow body portion, each horizontal rib aligned in the same plane, perpendicular to the long axis of the elongate hollow body portion.

16. The radio frequency filter apparatus of claim 13, wherein the body portion has a rectangular cross-sectional shape perpendicular to the long axis.

17. The radio frequency filter apparatus of claim 10, wherein the body portion has four corner portions, each horizontal rib extending between two adjacent corner portions and each diagonal rib extending between two adjacent corner portions.

18. The radio frequency filter apparatus of claim 17, wherein each horizontal rib tapers to a maximum height in a middle section.

19. The radio frequency filter apparatus of claim 17, wherein each diagonal rib crosses one other diagonal rib between adjacent corner portions.

20. The radio frequency filter apparatus of claim 13, further including a calibration structure on the inner side of the body portion, the calibration structure including a boss.

* * * * *